Dec. 8, 1964 E. J. POLLEY 3,159,932

CHANNEL INDICATOR

Filed Jan. 19, 1961 2 Sheets-Sheet 1

INVENTOR
Eugene J. Polley
BY Francis W. Crotty
ATTORNEY

CHANNEL INDICATOR
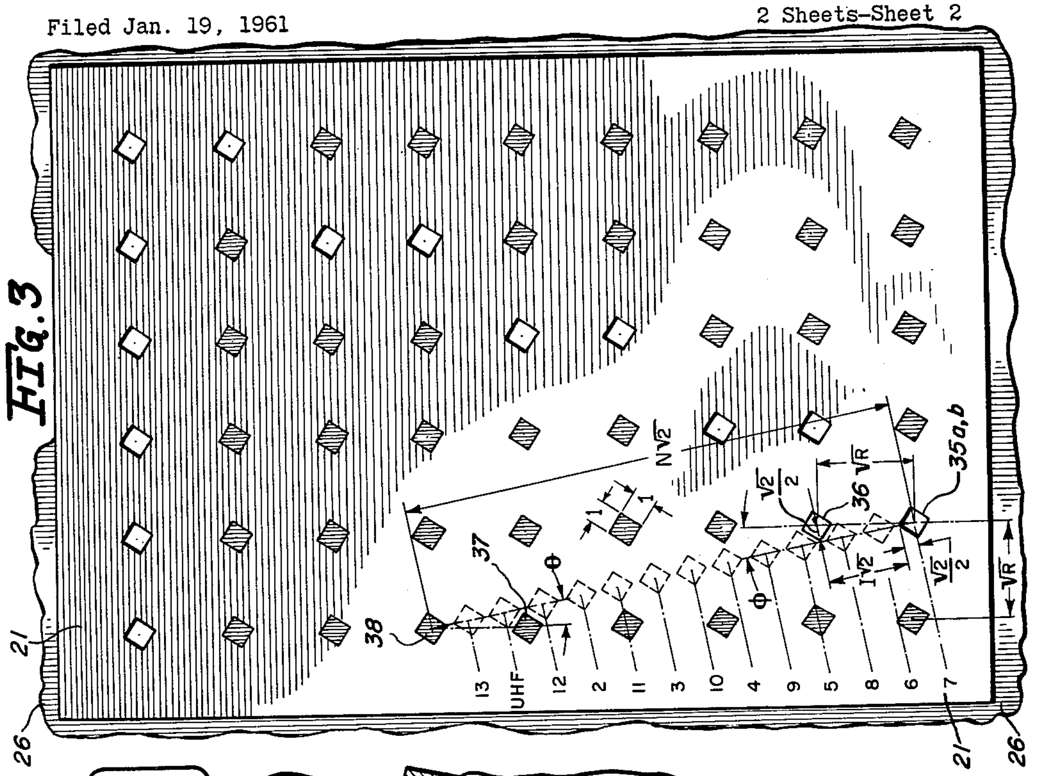
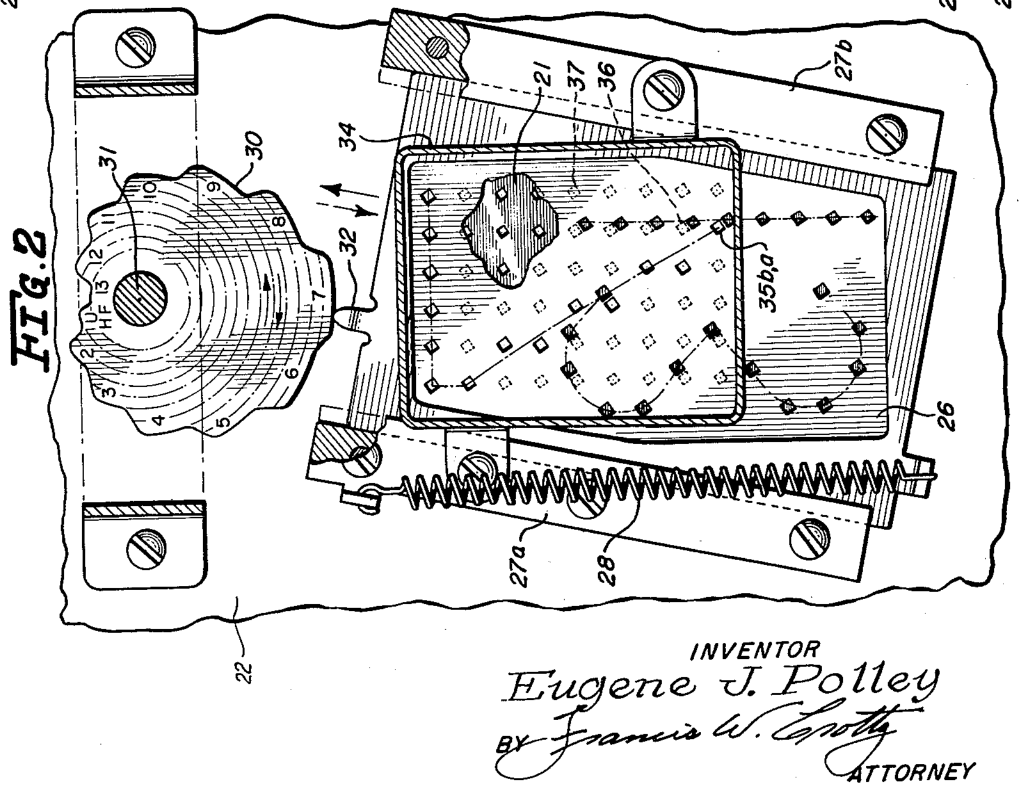
INVENTOR
Eugene J. Polley
BY Francis W. Crotty
ATTORNEY United States Patent Office 3,159,932
Patented Dec. 8, 1964

3,159,932
CHANNEL INDICATOR

Eugene J. Polley, Lombard, Ill., assignor to Zenith Radio Corporation, a corporation of Delaware Filed Jan. 19, 1961, Ser. No. 83,673
1 Claim. (Cl. 40—28)

This invention is directed to a channel indicator for a wave-signal receiver, and particularly to an indicator displaying a numeric by means of luminous points on an opaque field.

Channel indicators of various types are known and are especially beneficial in television receivers. In such an environment, it is possible for the viewer who normally observes the receiver from a considerable distance to determine the exact channel to which the receiver is tuned without having to approach the instrument. More importantly, however, the advent of remote control systems for television receivers makes necessary a channel indicator which displays an exceptionally large and legible number.

In the present state of the art there are two common types of channel indicators. One type may place the numbers on the periphery of the channel selection knob or alternatively link the knob to a rotating disc which has the channel numbers around its periphery with each number being viewed separately through a suitable frame. Current design trends tend to emphasize the picture tube area and leave only a thin surrounding frame thereby severely limiting both interior and exterior space on a television receiver. With the above type of channel indicator the size of the number is of course limited since enough space must be provided on the channel selection knob or associated disc for all of the channels which are to be received. Another arrangement displays a number by use of light projection means. An example of this type of device is Patent No. 2,681,634 issued June 22, 1954, to Eugene J. Polley and assigned to the present assignee of this application. However, even the light projection arrangements have limitations as to the size and legibility of the number to be displayed. As the size of the number is increased, it is no longer possible to utilize inexpensive point light sources such as low voltage incandescent bulbs and it then becomes necessary to employ comparatively expensive optical lenses and reflectors to obtain the large legible high contrast character desired.

It is an object of this invention to provide an improved channel indicator for a wave-signal receiver.

It is another object of this invention to provide a novel channel indicator which is readily visible even in a brightly illuminated room and which can be seen from a considerable distance.

It is a particular object of this invention to provide a channel indicator for a wave-signal receiver which is simple and expedient to assemble and economical to manufacture.

In accordance with the invention, a channel indicator for indicating a selected one of a plurality of communication channels to which a tuner of a wave-signal receiver is adjusted comprises a first plate having a pattern of apertures and a second plate also having a pattern of apertures. The plates are supported for relative movement. A cam is mechanically coupled to the tuner and has a plurality of sectors each corresponding to one of the communication channels and each having a constant but different radius which is an integral multiple of a predetermined unit radius, at least two adjacent sectors having radii which differ by two units. Cam follower means are included in the second plate and are responsive to engagement by a sector of the cam to move such plate to a predetermined one of a group of positions corresponding in number to the plurality of communication channels. The aperture patterns of the plates are related to one another to outline, by means of a group of aligned apertures therein, a numeric designating the channel selected by the instantaneous adjustment of the tuner.

The features of the present invention which are believed to be novel are set forth with particularity in the appended claim. The invention, together with further objects and advantages thereof, may best be understood by reference to the following description taken in connection with the accompanying drawings, in the several figures of which like reference numerals identify like elements, and in which:

FIGURE 2 is a sectional view taken along line 2—2 of FIGURE 1 showing a part of the channel indicator in greater detail; and FIGURE 3 is an enlargement of a portion of FIGURE 2.

Figure 1:
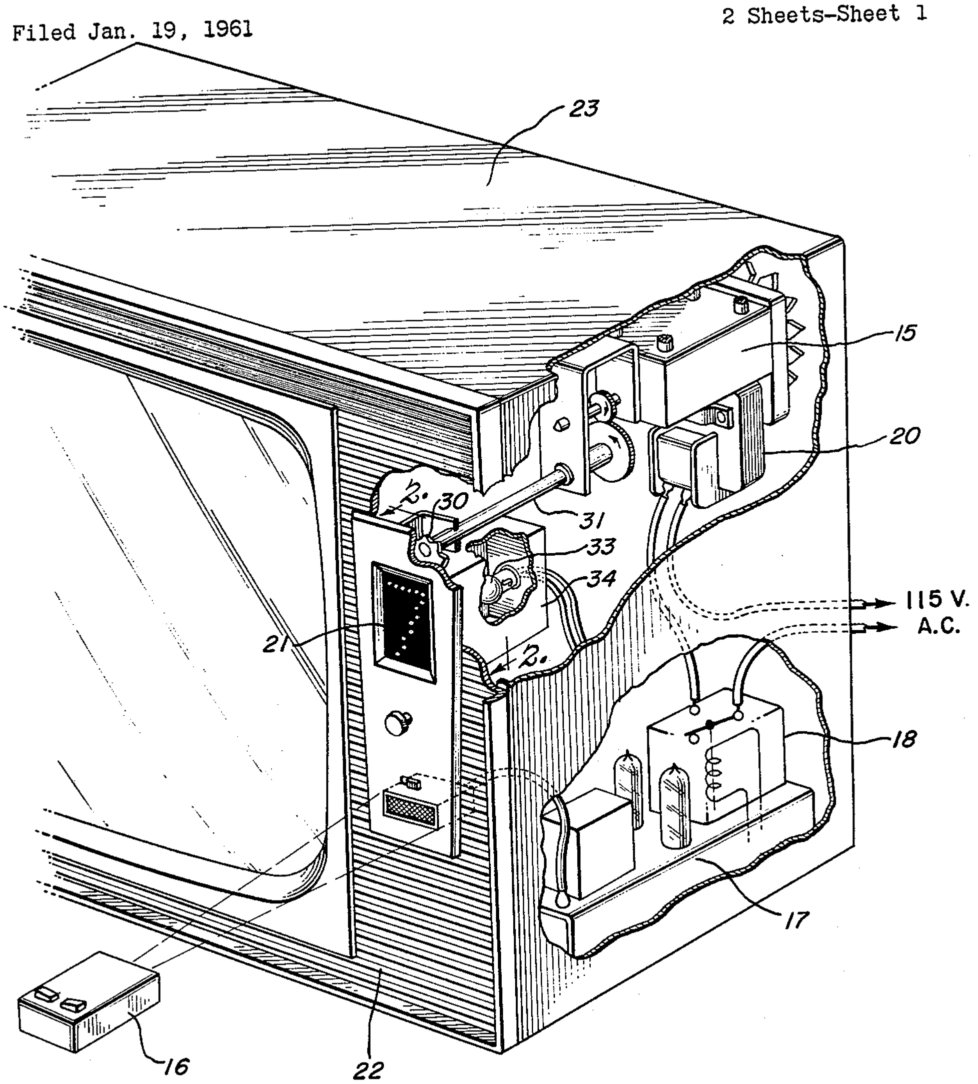
FIGURE 1 is a perspective view of a television receiver with a cut-away portion showing a channel indicator embodying the invention.

The television receiver of FIGURE 1 includes a tuner 15 for tuning the television receiver to any one of a plurality of communication channels. Tuner 15 is actuated by an ultrasonic transmitter 16 which generates a command signal when actuated by the user of the television receiver. The signal is detected and amplified by a control chassis 17 to close switch 18 thereby completing the energizing circuit to a driving motor 20 which is coupled to the tuner. A remote control system of this type is disclosed and claimed in Patent No. 2,817,025, Adler, assigned to the same assignee as the present application.

In accordance with the invention the channel indicator for indicating the selected one of a plurality of communication channels to which the television receiver is tuned includes a first plate 21 which is mounted in a front panel 22 of a cabinet 23 containing the television receiver. Plate 21 has a predetermined pattern of square apertures, as best shown in FIGURE 3, arranged in parallel straight rows and columns which are all equally spaced.

FIGURE 2 shows more clearly some of the structural details of the channel indicator. A second plate 26 also having a pattern of apertures is slidably mounted on the rear side of plate 21 by a pair of slide rails **27*a* and 27*b* which are fixed to panel 22. Plate 26 is biased in an upward direction, as shown by the solid arrow, by a spring 28. The slide rails 27*a* and 27*b* guide plate 26 for movement in a rectilinear path which is in a plane parallel to plate 21 and at a predetermined angle with the parallel straight columns of plate 21**.

Means are provided for mechanically linking tuner 15 to plate 26 and include a cam 30 mounted for rotation on a shaft 31 which is driven by tuner drive motor 20.

Cam 30 includes a series of steps 2–13 and UHF which correspond to the similarly designated communication channels which the standard receiver is equipped to receive. Each cam step is arcuate in profile and concentric with the axis of shaft 31, each being spaced a different radial distance from the axis as shown by the dashed construction circles. A cam follower 32 extends from plate 26 and is biased against the steps of cam 30 by spring 28. Thus, as cam 30 is rotated, plate 26 is moved successively to each of thirteen different positions, each position corresponding to a communication channel accepted by the television receiver.

Examination of the cam detail in FIGURE 2 reveals that the radial distance to sector 3 is two units larger than the radial distance to sector 2, assuming the radial separation of adjacent ones of the construction circles to represent one unit. This same chane in level is true of all sectors of the cam viewed in a counterclockwise direction from the UHF position to position 6. However, cam sector 7, which has the greatest radius, is only one unit larger than sector 6. Continuing in a counterclockwise direction, the sector radii decrease two units from position 7 to position 13 which is the low point of the cam and, itself, is only one unit smaller than the radial dimension of sector UHF. With this assignment of the levels of cam 30 to channel numbers there is a smaller maximum change in radius between cam sectors than otherwise which facilitates bi-directional rotation of the cam.

In accordance with the invention a number designating the channel selected by the instantaneous adjustment of tuner 15 is displayed by light from a source 33 illuminating the group of aligned apertures in plates 21 and 26. A light shield 34 concentrates the illumination over the area of plate 21 containing apertures. By way of illustration, with cam step 7 abutting cam follower 32, as shown in FIGURE 2, the aperture pattern of plates 21 and 26 are related to one another to outline the number "7." The "7" is, of course, backwards in FIGURE 2 since plate 21 is there viewed from its rear side. The dashed construction line connecting the apertures forming the 7 is purely for clarity of presentation. The unexposed apertures of plate 21 are shown in dotted outline.

THEORY OF CONSTRUCTION OF APERTURE PLATES

The critical factors in designing the aperture plates 21 and 26 are the size and spacing of the apertures of plate 21 and the angle of movement of plate 26 with respect to the apertures of plate 21.

Since each character to be displayed is unique, there is a separate group of apertures in plate 26 effective in the display of each number. Therefore, all 13 characters to be displayed could be traced on the plate; in FIGURE 2 the numbers 13 and 7 are shown as representative samples. The remainder of the apertures in plate 26 are not shown. While "7" is being displayed by the channel indicator, the remainder of the apertures of plate 26 are covered by the opaque areas of plate 21 as illustrated by the shaded apertures of number "13" on plate 26.

Once an aperture of plate 26 is aligned to display the particular character with which it is associated it is not aligned with an aperture of plate 21 in any of the other twelve positions of plate 26. This is illustrated in FIGURE 3 which views plate 21 from the front side and shows number "7" of FIGURE 2 in an enlarged form. An aperture 35*b* of plate 26 is shown aligned with aperture 35*a* of plate 21 forming the tail of the "7." As cam 30 rotates, moving plate 26 into its other twelve positions, the path of movement of aperture 35*b* is shown in dashed outlines, the numbers on the dashed outlines corresponding to the character which is being displayed in that position.

Since only one number is displayed at a time there must exist sufficient opaque area on plate 21 to cover the apertures on plate 26 which are used for the remaining twelve numerals to be displayed. Thus the square area enclosed by adjacent rows and columns of apertures must be at least equal to thirteen multiplied by the area of any individual aperture.

While the choice of a minimum area ratio is dictated by the number of characters to be displayed, the size of the aperture may be varied to gain a desired effect. For example if a character were desired which had a large amount of detail the density of the apertures could be increased by decreasing the size of the aperture; however, an attendant increase in the intensity of the light source is required to retain the same degree of brightness.

To avoid alignment with any other apertures of plate 21 aperture plate 26 must follow a path which is at an angle to the columns of apertures of plate 21; this angle is indicated by the letter Φ in FIGURE 3. It is apparent that the maximum number of spaces that the aperture of plate 26 may travel before it aligns itself with another aperture of plate 23 occurs when Φ is the smallest angle which is possible without the aperture aligning itself with any portion of apertures 36 and 37. The most efficient path of travel of aperture 35*b* is to bypass aperture 36 in the manner shown in FIGURE 3 with aperture 35*b* in positions 5 and 8 having its sides coinciding with the sides of aperture 36. Similarly if aperture 35*b* were circular the aperture in positions 5 and 8 would be tangent to aperture 36. The ratio between the rectilinear area enclosed by adjacent rows and columns of apertures and the area of an individual aperture is designated as R. Assuming that each side of an aperture is of unit length and therefore has a unit area, the distance between the centers of apertures 35 and 36 is the square root of R. The sine of the angle Φ is then:

$$\text{sine } \Phi = \frac{\sqrt{2}}{2\sqrt{R}} \quad (1)$$

In Equation 1 the side opposite the angle is one-half the diagonal of the aperture 36. In order to obtain the maximum number of positions between apertures 35*a* and 36 there must be an integral number of aperture spaces between the apertures. Thus an integer indicated by the letter I times the square root of 2 would indicate the distance covered by the diagonals of aperture 35*b* in positions 6 and 8 where I, of course, in this case would equal 2. The total side adjacent to the angle Φ also includes half of the diagonal of aperture 35*a*. Thus the cosine of Φ is:

$$\cos \Phi = \frac{\frac{\sqrt{2}}{2} + I\sqrt{2}}{\sqrt{R}} \quad (2)$$

Equation 3 is a well known trigonometric relationship:

$$\text{Cos}^2\Phi + \text{sine}^2\Phi = 1 \quad (3)$$

Substitution of Equations 1 and 2 into Equation 3 gives:

$$\frac{2}{R}\left(\frac{1}{2} + I\right)^2 + \frac{1}{2R} = 1 \quad (4)$$

Simplifying:

$$R = 2I^2 + 2I + 1 \quad (5)$$

In Equation 5 R is a function of the integer I. Some of the possible solutions of the equation are shown in Table I below:

*Table I*

| | | | | | |
|---|---|---|---|---|---|
| I | 1 | 2 | 3 | 4 | 5 |
| R | 5 | 13 | 25 | 41 | 61 |

Therefore, the spacing between apertures 35*a* and 36 must be at least the square root of R in order to achieve the proper relationship between aperture 36 and aperture 35*b* when in positions 5 and 8.

A second requirement for the design of the aperture plates is that they display a certain number of characters. It was previously shown that the number of characters to be displayed is equal to the number of positions of plate 26. If N number of characters are to be displayed, plate 26 must move N times the space of one position. In FIGURE 3 the space for one position is the diagonal of an aperture which is the square root of 2 and therefore the total space for N positions is N times the square root of 2 which is the distance from the center of aperture 35*a* to an aperture 38. The tranverse straight line path of motion of aperture 35*b* with the two columns of apertures of plate 21 forms an angle Θ at aperture 38 which is equal to the angle Φ since they are alternate interior angles. The angle θ has an opposite side equal to the square root of 2. The sine of the angle is:

$$\text{Sine } \Theta = \frac{\sqrt{R}}{N\sqrt{2}} \quad (6)$$

Since the two angles are equal:

$$\text{Sine } \Phi = \text{sine } \Theta \qquad (7)$$

$$\frac{\sqrt{2}}{2\sqrt{R}} = \frac{\sqrt{R}}{N\sqrt{2}} \qquad (8)$$

simplifying:

$$N = R \qquad (9)$$

Thus Equation 9 requires that R at least equal the number of desired characters which are to be displayed. R is also the ratio of the area enclosed by adjacent rows and columns compared to the area of an aperture. Therefore, Equation 9 is a theoretical proof of the above-mentioned requirement that the area ratio must be at least equal to the number of characters to be displayed. Of course, a larger area ratio than required may be used to reduce the criticalness of manufacturing tolerances. However a corresponding decrease in resolution and brightness of the image occurs as the area ratio is increased above its minimum value.

In addition to the restriction of Equation 9, Equation 5 limits the selection of a minimum area ratio R to those listed in Table I. This means that if, for example, 14 characters are to be displayed, an R of 14 will not be sufficient but rather an R of 25 must be used since this is the next highest R in Table I. The rationale behind this can be seen by inspection of FIGURE 3 where a slight increase of the area ratio, R, will not make available an additional position between apertures *35a* and *36*; a large incremental increase in the area ratios is required in order to increase the number of positions available.

After R has been chosen by the above method, the angle Φ may be computed from Equation 1 or 6.

Therefore, in designing a channel indicator for a television receiver which normally has 13 communication channels and 13 characters to be displayed, the area ratio R from Equation 9 must be 13. Referring to Table I, it is seen that the area ratio of 13 may be used and thus plate 21 is constructed with this ratio. The angle at which plate 26 moves is then from Equation 1:

$$\text{Arc sine}\frac{\sqrt{2}}{2\sqrt{R}} = \frac{\sqrt{2}}{2\sqrt{13}} = 11^\circ\ 19' \qquad (10)$$

The invention as described provides a channel indicator which displays a large and legible character. The displayed character is readily visible even in a brightly illuminated room due to the high contrast between the dull black background of plate 21 and the brightly illuminated apertures. Finally, the simple and economical construction of the channel indicator makes it competitive with present channel indicators for wave-signal receivers.

While a particular embodiment of the invention has been shown and described, it will be obvious to those skilled in the art that changes and modifications may be made without departing from the invention in its broader aspects, and, therefore, the aim in the appended claim is to cover all such changes and modifications as fall within the true spirit and scope of the invention.

I claim:

A channel indicator for indicating the selected one of a plurality of communication channels to which a tuner of a wave-signal receiver is adjusted, comprising: a first plate having a pattern of apertures; a cam mechanically coupled to said tuner and having a plurality of sectors each corresponding to one of said communication channels and each having a constant but different radius which is an integral multiple of a predetermined unit radius, at least two adjacent sectors having radii which differ by two units; a second plate also having a pattern of apertures; means for supporting said plates for relative movement; and cam follower means included in said second plate and responsive to engagement by a sector of said cam to move such plate to a predetermined one of a group of positions corresponding in number to said plurality of communication channels, the aperture patterns of said plates being related to one another to outline by means of a group of aligned apertures therein a numeric designating the channel selected by the instantaneous adjustment of said tuner.

References Cited in the file of this patent

UNITED STATES PATENTS

| | | |
|---|---|---|
| 609,915 | Sibley | Aug. 30, 1898 |
| 1,172,455 | Hildburgh | Feb. 22, 1916 |
| 1,322,542 | Chauvet | Nov. 25, 1919 |
| 2,426,079 | Bliss | Aug. 19, 1947 |
| 2,583,184 | McCarty et al. | June 22, 1952 |
| 2,642,685 | Handley | June 23, 1953 |
| 2,645,047 | O'Gorman | July 14, 1953 |
| 2,903,375 | Polley | Sept. 8, 1959 |
| 2,917,733 | Justus | Dec. 15, 1959 |